United States Patent
Balraj et al.

(10) Patent No.: US 8,964,908 B2
(45) Date of Patent: *Feb. 24, 2015

(54) RECEIVER CIRCUIT AND METHOD FOR DETECTING DATA

(75) Inventors: Rajarajan Balraj, Duesseldorf (DE); Biljana Badic, Duesseldorf (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,829

(22) Filed: Feb. 15, 2012

(65) Prior Publication Data

US 2013/0208835 A1   Aug. 15, 2013

(51) Int. Cl.
*H04L 27/06* (2006.01)

(52) U.S. Cl.
USPC .......................................................... 375/341

(58) Field of Classification Search
USPC .......................................................... 375/341
See application file for complete search history.

(56) References Cited

U.S. PATENT DOCUMENTS

| | | | |
|---|---|---|---|
| 7,813,453 | B2 | 10/2010 | Khandekar et al. |
| 8,619,928 | B2 | 12/2013 | Abrishamkar et al. |
| 8,660,217 | B2 | 2/2014 | Choi et al. |
| 8,665,693 | B1 | 3/2014 | Cheng et al. |
| 2006/0171483 | A1 | 8/2006 | Jia et al. |
| 2009/0274074 | A1* | 11/2009 | Astely ........................... 370/280 |
| 2010/0254476 | A1* | 10/2010 | Li et al. ......................... 375/267 |
| 2012/0051468 | A1* | 3/2012 | Weitkemper et al. ......... 375/340 |
| 2012/0099638 | A1 | 4/2012 | Wang |
| 2013/0128940 | A1 | 5/2013 | Mergen et al. |

OTHER PUBLICATIONS

U.S. Appl. No. 13/396,898, filed Feb. 15, 2012.
3GPP TS 36.201, V8.3.0 (Mar. 2009), Release 8.
3GPP TSG-RAN WG4 #AdHoc1, Sophia Antipolis, France, Jan. 18-22, 2010, p. 1-7.
Jonathan Duplicy, et al., "MU-MIMO in LTE Systems", EURASIP Journal on Wireless Communications and Networks, vol. 2011, Article ID 496763, 13 Pages.
EUSIPCO 2011, 19th European Signal Processing Conference, Aug. 29-Sep. 2, 2011, Barcelona, Spain, p. 1-2.
Office Action Dated Mar. 25, 2014 U.S. Appl. No. 13/627,504.
U.S. Appl. No. 13/627,504, filed Sep. 26, 2012. 41 Pages.
Non-Final Office Action dated Nov. 27, 2013 for U.S. Appl. No. 13/396,898. 28 Pages.
3GPP, LTE; Evolved Universal Terrestrial radio Access (E-UTRA); Long Term Evolution (LTE) Physical Layer; General Description; ETSI TS 136 201 V8.3.0 (Apr. 2009).
3GPP, LTE; Evolved Universal Terrestrial Radio Access (E-UTRA); Long Term Evolution (LTE) Physical Layer; General Description; ETSI TS 136 201 V9.1.0 (Apr. 2010).
3GPP, LTE; Evolved Universal Terrestrial Radio Access (E-UTRA); Long Term Evolution (LTE) Physical Layer; General Description; ETSI TS 136 201 V10.0.0 (Jan. 2011).
J. Wang, et al.; "An Improved Soft-Output MMSE V-BLAST Detector"; International Conference on Communication Technology (CCT06) p. 1-4, Nov. 2006.

(Continued)

*Primary Examiner* — Tanmay Shah
(74) *Attorney, Agent, or Firm* — Eschweiler & Associates, LLC

(57) ABSTRACT

A method includes a first step of receiving a signal on the basis of a mobile communications standard supporting multiple predefined modulation alphabets and a second step of detecting data of the received signal on the basis of a modulation alphabet which includes modulation symbols of at least two of the multiple predefined modulation alphabets.

20 Claims, 5 Drawing Sheets

(56) References Cited

OTHER PUBLICATIONS

Y. Lomnitz, et al.; "Efficient Maximum Likelihood Detector for MIMO Systems with Small Number of Streams", Electronic Letters, vol. 43, No. 22, 2007 p. 1-3.

Z. Bai, et al.; "On MIMO With Successive Interference Cancellation Applied to UTRA LTE" In Proc of the 3rd International Symposium on Communications, Control and Signal Processing, Malta, Mar. 2008, p. 1009-1013.

Notice of Allowance Dated Aug. 18, 2014 U.S. Appl. No. 13/627,504.

Office Action Dated Jun. 20, 2014 U.S. Appl. No. 13/396,898.

Notice of Allowance Dated Nov. 20, 2014 U.S. Appl. No. 13/396,898.

* cited by examiner

RECEIVER CIRCUIT AND METHOD FOR DETECTING DATA

FIELD

The invention generally relates to the field of mobile communications. In particular, the invention relates to a receiver circuit and a method for detecting data.

BACKGROUND

In radio communications systems multiple User Equipments (UEs) may share the same frequency and time resource such that mutual interferences may occur. Receiver circuits and methods for detecting data performed by receiver circuits constantly have to be improved. In particular, it may be desirable to improve the reception quality and performance of mobile communications receiver circuits.

BRIEF DESCRIPTION OF THE DRAWINGS

The accompanying drawings are included to provide a further understanding of embodiments and are incorporated in and constitute a part of this description. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
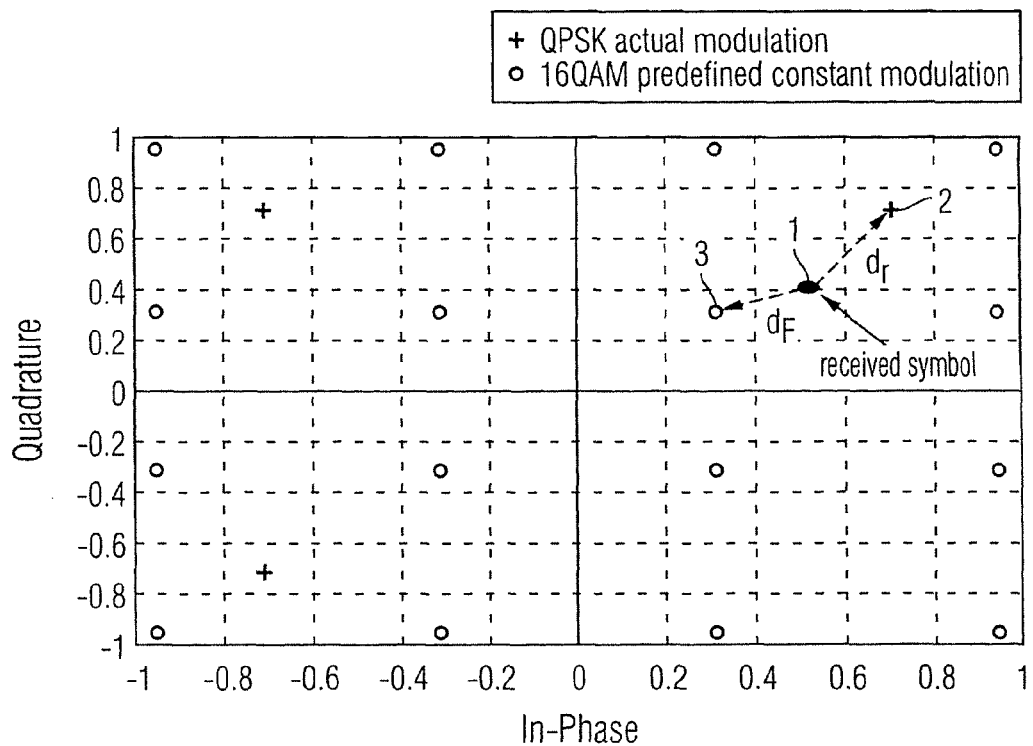
FIG. 1 schematically illustrates a detection of a data symbol.

In the following, embodiments are described with reference to the drawings wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or embodiments are merely examples and that other aspects and/or embodiments may be utilized and structural and functional modifications may be made without departing from the scope of the present disclosure. In addition, while a particular feature or aspect of an embodiment may be disclosed with respect to only one of several implementations, such feature or aspect may be combined with one or more other features or aspects of the other implementations as it may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

In the following, various methods and receiver circuits are described separately or with reference to each other. It is understood that comments made in connection with a described method may also hold true for a corresponding receiver circuit configured to perform the method and vice versa. For example, if a specific method step is described, a corresponding receiver circuit may include a unit to perform the described method step, even if such a unit is not explicitly described or illustrated in the figures.

The methods and receiver circuits described herein may be based on or may support arbitrary (in particular digital) modulation schemes for modulating data. For example, a detected data signal may be modulated according to a Quadrature Amplitude Modulation (QAM) modulation scheme, a Binary Phase Shift Keying (BPSK) modulation scheme, a Quadrature Phase Shift Keying (QPSK) modulation scheme, a 8-QAM modulation scheme, a 16-QAM modulation scheme, a 64-QAM modulation scheme or any other suitable modulation scheme. In this specification, such known modulation schemes may also be referred to as "predefined" modulation schemes. In the following, the terms "modulation alphabet" and "modulation symbol" may be used wherein a modulation alphabet may be defined as a set of modulation symbols. A modulation symbol may be represented by a complex number in a constellation diagram wherein the complex number is assigned to a value of one or more bits. For example, a complete QPSK modulation alphabet may consist of modulation symbols representing the bit value combinations "00", "01", "10" and "11". Note however that the term "modulation alphabet" needs not be used for a complete set of modulation symbols of a modulation scheme. Referring back to QPSK, a modulation alphabet may also be restricted to the modulation symbols representing the bit combinations "00" and "01".

The methods and receiver circuits described herein may be used for various wireless communication networks such as Code Division Multiple Access (CDMA), Time Division Multiple Access (TDMA), Frequency Division Multiple Access (FDMA), Orthogonal FDMA (OFDMA) and Single Carrier FDMA (SC-FDMA) networks. The terms "network", "system" and "radio communications system" may be used synonymously. A CDMA network may implement a radio technology such as Universal Terrestrial Radio Access (UTRA), cdma2000, etc. UTRA includes Wideband-CDMA (W-CDMA) and other CDMA variants. cdma2000 covers IS-2000, IS-95 and IS-856 standards. A TDMA network may implement a radio technology such as Global System for Mobile Communications (GSM) and derivatives thereof such as, e.g., Enhanced Data Rate for GSM Evolution (EDGE), Enhanced General Packet Radio Service (EGPRS), etc. An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). In particular, the methods and receiver circuits described herein may be used in the framework of mobile communication standards supporting multiple predefined modulation schemes or modulation alphabets. For example, the 3GPP Long Term Evolution (LTE) standard, which is based on the GSM/EDGE and UMTS/HSPA (High Speed Packet Access) technologies, supports QPSK, 16-QAM and 64-QAM. Similarly, each of WiMAX and Wireless LAN supports BPSK, QPSK, 16-QAM and 64-QAM.

In radio communications systems, a transmitter transmitting one or more radio communications signals over one or more radio communications channels may be present. The transmitter may be a base station or a transmitting device included in a user's device, such as a mobile radio transceiver, a handheld radio device or any similar device. Note that, according to the UMTS standard, a base station may also be referred to as "Node B". Radio communications signals transmitted by transmitters may be received by receivers such as a receiving device in a mobile radio transceiver or mobile station, a handheld radio device or any similar device. Receiver circuits as described herein may e.g. be included in such receivers. Note that, according to the UMTS standard, a mobile station may also be referred to as "User Equipment" (UE).

The methods and receiver circuits described herein may be operated according to a Multiple Input Multiple Output (MIMO) technique providing the use of multiple antennas at both the transmitter and receiver. Of course, the methods and receiver circuits described herein may also be operated for the case of only one antenna at the receiver. MIMO is a part of wireless communications standards such as IEEE 802.11n (Wi-Fi), 4G, 3GPP Long Term Evolution, WiMAX and HSPA+. In this context, the term "spatial-multiplexing" may be used which corresponds to a transmission technique in MIMO wireless communication and which may be used to transmit independent and separately encoded data signals, so-called streams, from each of the multiple transmit antennas of a base station. Similarly, a UE may receive multiple transmitted streams by means of a plurality of receive antennas. The encoding of data in spatial-multiplexing may be based on an open-loop approach or a closed-loop approach.

Multi-User (MU) MIMO schemes allow multiple UEs to share the same resource in frequency and time domains, i.e. same resource blocks, and multiplex their signals on the spatial domain. MU-MIMO may be regarded as an extended version of the Space-Division Multiple Access (SDMA) scheme. In 3G/HSPA MU-MIMO, the UEs may also share the same time and channelization code (e.g. Orthogonal Variable Spreading Factor (OVSF)/Spreading Code). For MU-MIMO, a base station may schedule a set of UEs for a data transmission with MU-MIMO. Transmission data is then transmitted from the base station to the scheduled UEs simultaneously. During a data transmission interferences between data streams transmitted from the base station to the co-scheduled UEs may occur. In MU-MIMO, for an appropriate detection of data symbols received at a UE of interest it may be helpful to suppress interferences from co-scheduled UEs (i.e. interfering UEs). Note that the terms "UE of interest" and "co-scheduled UE/interfering UE" do not refer to an identical UE, but correspond to two different mobile stations of two different users. For this purpose, it may be required to detect data symbols at the UE of interest, the symbols actually being scheduled for an interfering UE. The detection may be based on or may include a Maximum Likelihood (ML) algorithm or a Near ML algorithm (e.g. sphere decoder, QRD-M, SIC, etc).

In the following, an ML algorithm is specified which may be used for detecting data symbols at the UE of interest, the symbols actually being scheduled for an interfering UE. Reference is now made to a MU-MIMO system in which a base station communicates with a number of K UEs (or receivers) simultaneously on the same time-frequency resource. The base station may include an arbitrary number of n>1 transmission antennas while each of the K UEs includes multiple receive antennas. The precoded data x transmitted by the base station at an arbitrary time instant may be expressed as $$x = \frac{1}{\sqrt{K}} \sum_{i=1}^{K} w_i s_i \quad (1)$$

wherein $w_i$ denotes a precoding vector of dimension n×1 for the i-th UE which may be chosen from a precoding codebook having an arbitrary number of entries. In addition, $s_i$ denotes a (normalized) data symbol of a modulation alphabet employed by the base station for encoding the transmitted data for the i-th user. The precoded data x thus corresponds to a vector of dimension n×1 containing the signals sent by the n transmission antennas of the base station. The vector x may be normalized, i.e.

$$E[x^*x]=1 \quad (2)$$

wherein E denotes an expectation operator.

A signal y received by a UE of interest may be expressed as a vector $$y=Hx+v \quad (3)$$

of dimension m×1 wherein H denotes a channel matrix of dimension m×n assumed to be known or estimated at the UE of interest. In addition, v denotes noise, for example Additive White Gaussian Noise (AWGN) having a variance of $\sigma_n^2$. Combining equations (1) and (2), the received signal y may be expressed as $$y = \frac{1}{\sqrt{K}} H \sum_{i=1}^{K} w_i s_i + v \quad (4)$$

or $$y = \frac{1}{\sqrt{K}} H w_1 s_1 + \frac{1}{\sqrt{K}} H \sum_{i=2}^{K} w_i s_i + v. \quad (5)$$

At the UE of interest it may be desired to decode the transmitted signal s from the received signal y. An ML solution may correspond to finding the most likely solution $$\hat{s} = \underset{s \in G''}{\operatorname{argmax}} Pr(y \mid s) \quad (6)$$

for the transmitted signal s. Here, G denotes a modulation alphabet including a number of M modulation symbols that has been used for modulating the transmitted data while the function "Pr" denotes a probability of a respective solution s. The ML solution of equation (6) corresponds to minimizing the noise v, i.e. by finding the minimum value $$\hat{s} = \underset{s \in G''}{\operatorname{argmin}} \|y - H_{\mathit{eff}} s\|^2 \quad (7)$$

wherein $\|\cdot\|$ denotes an arbitrary norm, for example an $L_2$ norm and in particular a Euclidean norm. In addition, $H_{\mathit{eff}}$ denotes an effective channel matrix which may be defined as $H_{\mathit{eff}} = H(w_1 \; w_2) = (h_1 \; h_2)$.

Equations (6) and (7) may be solved by a brute-force implementation in which all n transmission antennas are scanned. That is, taking into account the M modulation symbols of the employed modulation scheme G all possible values for s in equation (6) are considered resulting in $M^n$ hypothesis or hypothetical values. For example, if G corresponds to a 64-QAM modulation alphabet including 64 modulation symbols and the number of transmission antennas n equals two, a brute-force implementation requires determining 4096 hypotheses.

In the following, a further ML scheme is described in which the number of hypotheses to be determined may be decreased by merely scanning n−1 transmission antennas. For each hypothesis on the n−1 transmission antennas an optimal choice for the remaining transmission antenna may then be calculated in a further step which is described below. The further ML scheme may at least partly coincide with an ML scheme presented in the document "Efficient maximum likelihood detector for MIMO systems with small number of streams", in Proc. of IEE Electronic Letters, Vol. 43, No. 22, October 2007 by Y. Lomnitz and D. Andelman which is included herein by reference.

The minimization of equation (6) may be expressed as $$\hat{s} = \arg\min_{\tilde{s} \in G^{n-1}} d_s^2 = \arg\min_{\tilde{s} \in G^{n-1}} \|y - \tilde{H}_{\mathit{eff}}\tilde{s} - h_1 s_1\|^2 \quad (8)$$

wherein $s_1$ denotes the signal transmitted by the first transmission antenna of the base station and $\tilde{s}$ denotes a vector of dimension n−1 including the signals from the remaining n−1 transmission antennas. Further, $h_1$ denotes the first column of the channel matrix $H_{\mathit{eff}}$ and $\tilde{H}_{\mathit{eff}}$ denotes a matrix including columns 2 to n of the channel matrix H.

An optimal choice for a single transmission antenna may correspond to a Maximum Ratio Combining (MRC) solution in a Maximum Likelihood Sequence Estimation (MLSE) sense. That is, the MLSE of a stream transmitted by a single transmission antenna and received by one or more antennas may be decomposed into a maximal ratio combiner followed by an MLSE decoder. In particular, an ML estimator of a single data symbol from a discrete constellation may be an MPRC followed by a slicer. An optimal choice for a single transmission antenna thus may be expressed as $$\hat{s} = \arg\min_{s \in G} \|y - hs\|^2 = \mathrm{slice}[(h*h)^{-1} h*y] \quad (9)$$

wherein the asterisk denotes complex (or hermitian) conjugation. The function "slice" may be defined as $$\mathrm{slice}(x) = \arg\min_{s \in G} \|x - s\|^2. \quad (10)$$

Hence, in order to find the solutions according to the further ML scheme, all combinations of $\tilde{s}$ are scanned and given a hypothesis on $\tilde{s}$, the minimum value of $d_s^2$ or $\|y - Hs\|^2$ with respect to $s_1$ is obtained by applying equation (9) resulting in $$\hat{s}_1(\tilde{s}) = \arg\min_{s_1 \in G} \|y - \tilde{H}_{\mathit{eff}}\tilde{s} - h_1 s_1\|^2 = \mathrm{slice}[(h_1*h_1)^{-1} h_1 * (y - \tilde{H}_{\mathit{eff}}\tilde{s})]. \quad (11)$$

Considering now the case of two transmission antennas, i.e. n=2, equation (8) becomes $$\hat{s} = \arg\min_{s_1 \in M_1} d_s^2 = \arg\min_{s_1 \in M_1} \|y - h_1 s_1 - h_2 s_2\|^2 \quad (12)$$

wherein the index 1 may denote the UE of interest and the index 2 may denote the interfering UE. Applying the above described further ML scheme, in a first step all $m_1$ possibilities for $s_1$ are scanned wherein $m_1$ denotes a number of constellation points for a particular modulation scheme $M_1$ employed at the UE of interest. For each of these possibilities, the ML solution for $s_2$ is calculated by $$\hat{s}_2(s_1) = \mathrm{slice}[(h_2*h_2)^{-1} h_2*(y - h_1 s_1)] \quad (13)$$

wherein $s_2$ may be chosen from a modulation alphabet G, i.e. $s_2 \in G$. In other words, for each of the indicated possibilities a distance $$d_s^2 = \|y - h_1 s_1 - h_2 \hat{s}_2\|^2 \quad (14)$$

is calculated. The minimum of the values calculated for the distance $d_s^2$ then corresponds to the most likely value of s. Note that an illustrative example of the minimum distance becomes apparent from FIG. 3.

For the case of s being coded, it may not be desired to determine the most likely value of s (see above), but to determine bit metrics or symbol metrics in order to perform soft decoding or turbo decoding. For this case, Log Likelihood Ratios (LLR) may be determined for a number of l bits wherein l=1, ..., $\log_2(M_1)$. Depending on the value of the regarded bit, values $d_s$ are calculated according to equation (14). For each calculated value $d_s$, values $d^1_{min}$ and $d^0_{min}$ are updated, the superscript denoting the bit value. If the bit value equals one, the value $d^1_{min}$ is updated according to $$d_{min}^1(l) = \min(d_{min}^1(l), d_s). \quad (15)$$

Similarly, if the bit value equals zero, the value $d^0_{min}$ is updated according to $$d_{min}^0(l) = \min(d_{min}^0(l), d_s). \quad (16)$$

Note that the values $d_{min}^0(l)$ and $d_{min}^1(l)$ initially need to be initialized to an initial value, for example a value of zero or $+\infty$. Having obtained the minimum values $d^0_{min}$ and $d^1_{min}$, an LLR value may be calculated according to $$LLR_l = (d_{min}^0(l) - d_{min}^1(l)) \frac{1}{\sigma_n^2}. \quad (17)$$

FIG. 1 schematically illustrates a detection of a data symbol 1 received at a UE of interest, the data symbol 1 being actually scheduled for an interfering UE. A similar detection may e.g. occur in a radio communications system based on the LTE standard. In connection with FIG. 1, it is assumed that the received data symbol 1 has actually been modulated according to a QPSK modulation scheme while a detection of the received symbol at the UE of interest is based on a 16-QAM modulation alphabet. Note that the modulation scheme used by the interfering UE is not known by the UE of interest. In FIG. 1, the modulation symbols of the QPSK and 16-QAM schemes are illustrated by small crosses and circles, respectively. Note that the usage of the 16-QAM modulation alphabet may be constant or permanent, i.e. detecting data symbols at the UE of interest is always based on the 16-QAM modulation alphabet independent of the actually applied modulation scheme. Note further that the received data symbol 1 is shifted with respect to the actual QPSK symbol 2 that has been used for a modulation. The distance between the received data symbol 1 and the actual QPSK symbol 2 is illustrated by an arrow of length $d_T$ and may be regarded as noise causing the shift between the received data symbol 1 and the QPSK symbol 2.

In FIG. 1, detecting the data symbol 1 at the UE of interest is merely based on the 16-QAM modulation alphabet and corresponds to finding the minimum distance between the received data symbol 1 and the set of 16-QAM modulation symbols. The distance between the received data symbol 1 and the nearest 16-QAM symbol 3 is illustrated by an arrow of length $d_F$. Referring back to the above described further ML scheme, detecting the data symbol corresponds to finding the minimum distance according to equation (14) wherein $s_2 \in G = M_{16\text{-}QAM}$, the set $M_{16\text{-}QAM}$ including all modulation symbols of the 16-QAM modulation alphabet. In other words, FIG. 1 illustrates a quantization error when assuming the modulation alphabet $s_2$ (i.e. the modulation symbols of the interfering UE) to be 16-QAM regardless of the actual modulation alphabet of the interfering UE.

Figure 2:
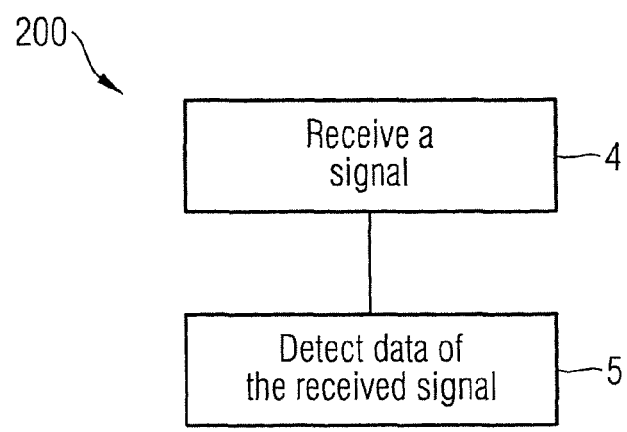
FIG. 2 schematically illustrates a method 200 as an exemplary embodiment.

FIG. 2 schematically illustrates a method 200 including method steps 4 and 5. In the method step 4, a signal is received on the basis of a mobile communications standard supporting multiple predefined modulation alphabets. For example, a receiver circuit of a mobile communications system may receive a signal wherein the system is based on the LTE standard which supports the modulation schemes QPSK, 16-QAM and 64-QAM. In the method step 5, data of the received signal is detected on the basis of a modulation alphabet that includes modulation symbols of at least two of the multiple predefined modulation alphabets. For example, the modulation alphabet may include all modulation symbols of the QPSK, 16-QAM and 64-QAM modulation schemes. Various embodiments of method 200 are described below. In addition, detecting a data symbol on the basis of method 200 is described in connection with FIG. 3.

Figure 3:
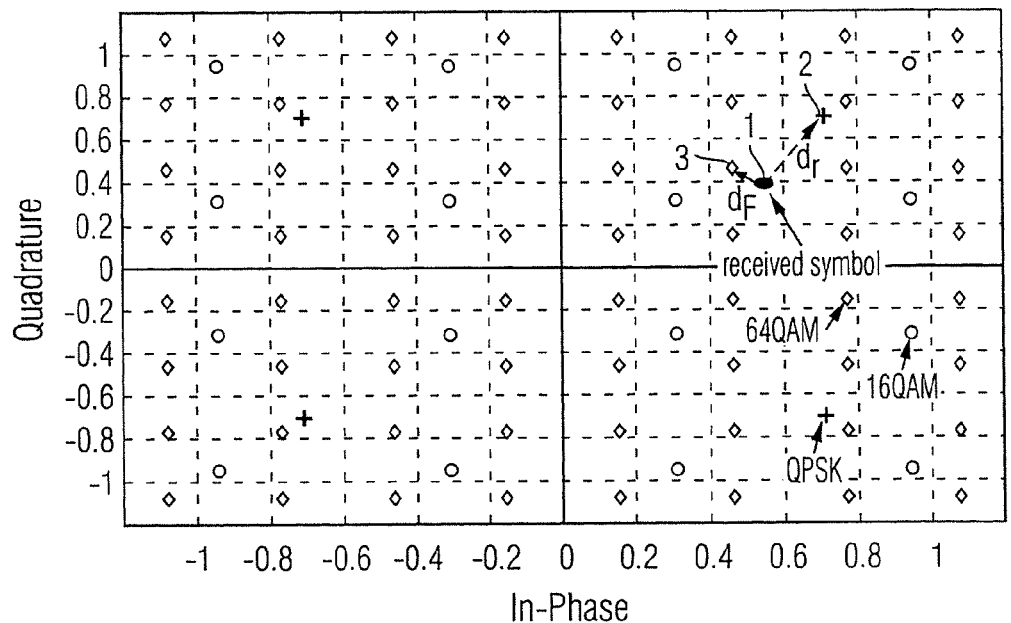
FIG. 3 schematically illustrates a detection of a data symbol.

FIG. 3 schematically illustrates a detection of a data symbol 1 received at a UE of interest, the data symbol 1 actually being scheduled for a co-scheduled interfering UE. A similar detection may e.g. occur in a radio communications system based on the LTE standard. Similar to FIG. 1 it is assumed that the received data symbol 1 is actually modulated according to a QPSK modulation scheme. In contrast to FIG. 1, detecting the data symbol 1 at the UE of interest is based on a modulation alphabet including the QPSK modulation alphabet, the 16-QAM modulation alphabet and the 64-QAM modulation alphabet. In FIG. 3, the modulation symbols of the QPSK and 16-QAM schemes are illustrated by small crosses and circles, respectively, while the modulation symbols of the 64-QAM scheme are illustrated by small diamonds. Again, the minimum distance between the received data symbol 1 and the symbols of these modulation schemes is illustrated by an arrow of length $d_F$. Referring back to equation (13), $s_2 \in G = \{M_{QPSK}, M_{16\text{-}QAM}, M_{64\text{-}QAM}\}$ with $M_{QPSK}$, $M_{16\text{-}QAM}$ and $M_{64\text{-}QAM}$ denoting the complete modulation alphabets of the QPSK, 16-QAM and 64-QAM modulation schemes, respectively. In a more general embodiment a choice may be $s_2 \in G \in \{M_{QPSK}, M_{16\text{-}QAM}, M_{64\text{-}QAM}\}$.

Comparing the minimum distances $d_F$ of FIGS. 1 and 3, it becomes apparent that the minimum distance $d_F$ of FIG. 3 is smaller than the minimum distance $d_F$ of FIG. 1. The reduced distance results from the fact that the detection according to FIG. 3 is not reduced to the 16-QAM modulation alphabet, but additionally takes into account modulation symbols of the 64-QAM modulation alphabet. Note that the reduced distance may result in a smaller quantization error since the nearest modulation symbol 3 in FIG. 3 is closer to the QPSK modulation symbol 1 compared to FIG. 1. A minimization of the quantization error may lead to an improved performance of the receiver. Performances of receivers using various decoding schemes are illustrated in FIGS. 7A to 7D.

In the following, various embodiments of the method 200 and all further methods described herein are specified. Of course, specified features of the individual embodiments may be combined in arbitrary ways resulting in further embodiments which are not explicitly described for the sake of simplicity. In addition, it is understood that a receiver configured to perform method 200 may include units configured to perform one or more of the described features.

According to an embodiment of the methods described herein, the assumed modulation alphabet of the interfering/co-scheduled includes all modulation symbols of at least two of the multiple predefined modulation alphabets. For example, the mobile communications standard may correspond to the LTE standard such that possible modulation alphabets used for detecting data of the received signal may be $\{M_{QPSK}, M_{16\text{-}QAM}\}$, $\{M_{QPSK}, M_{64\text{-}QAM}\}$, $\{M_{16\text{-}QAM}, M_{64\text{-}QAM}\}$ or $\{M_{QPSK}, M_{16\text{-}QAM}, M_{64\text{-}QAM}\}$ wherein $M_{QPSK}$, $M_{16\text{-}QAM}$ and $M_{64\text{-}QAM}$ denote the complete modulation alphabets of the QPSK modulation scheme, the 16-QAM modulation scheme and the 64-QAM modulation scheme, respectively. Similarly, if the mobile communications standard corresponds to the WiMAX or the Wireless LAN standard, possible modulation alphabets for detecting data of the received signal may include at least on of the modulation alphabets $M_{BPSK}$, $M_{QPSK}$, $M_{16\text{-}QAM}$ and $M_{64\text{-}QAM}$.

According to an embodiment of the methods described herein, the modulation alphabet includes all modulation symbols of all multiple predefined modulation alphabets. For example, the mobile communications standard may correspond to the LTE standard such that the modulation alphabet for detecting data of the received signal may be $\{M_{QPSK}, M_{16\text{-}QAM}, M_{64\text{-}QAM}\}$. Similarly, if the mobile communications standard corresponds to the WiMAX or the Wireless LAN standard, the modulation alphabet used for detecting data of the received signal may correspond to $\{M_{BPSK}, M_{QPSK}, M_{16\text{-}QAM}, M_{64\text{-}QAM}\}$.

According to an embodiment of the methods described herein, the modulation alphabet includes at least two of $M_{QPSK}$, $M_{16\text{-}QAM}$ or $M_{64\text{-}QAM}$.

According to an embodiment of the methods described herein, each of the multiple predefined modulation alphabets is configured to encode all value combinations of at least two bits. It is thus not possible for a predefined modulation alphabet to merely encode a reduced number of value combinations. For example, for the case of two bits it is not possible that a predefined modulation alphabet is merely configured to encode the value combinations "00" and "01", but not configured to encode the combinations "10" and "11". Rather, the modulation alphabet has to include all possible value combinations "00", "01", "10" and "11". For the case of LTE, it is thus not possible to identify a proper subset of one of the modulation alphabets $M_{QPSK}$, $M_{16\text{-}QAM}$ or $M_{64\text{-}QAM}$ as a predefined modulation alphabet.

According to an embodiment of the methods described herein, detecting the symbol includes performing an ML algorithm or a Near ML algorithm. For example, the algorithm may correspond to or may include one of the ML algorithms explained above. Alternatively, detecting the symbol may correspond to or may include any other algorithm suitable to replace the ML or Near ML algorithm. In particular, the alternative algorithm may depend on a choice of the modulation alphabet according to method 200.

According to an embodiment of the methods described herein, a method may include a method step of hard-coding information on the modulation alphabet in a receiver or a receiver circuit. Referring back to FIG. 3, detecting the received data symbol 1 was based on the 16-QAM and 64-QAM modulation alphabets. An information for the receiver circuit to employ these modulation alphabets may e.g. be included in a non-volatile memory that may retain its data when the power supply of the receiver circuit is switched off. In particular, the information may be hard-coded, i.e. not modifiable during an operation of the receiver circuit or even not modifiable at all such that the information needs to be determined before the receiver circuit is implemented in a UE.

According to an embodiment of the methods described herein, the received signal is received by a first receiver circuit and the received signal includes first data transmitted by a transmitter to the first receiver circuit and second data transmitted by the transmitter to a second receiver circuit. For example, a method may be performed in a MU-MIMO communications system wherein the first data may correspond to data scheduled for a UE of interest while the second data may correspond to data scheduled for a co-scheduled interfering UE. Note that the first receiver circuit and the second receiver circuit are included in different mobile stations of different users. The first data and the second data may particularly be transmitted simultaneously on a same time-frequency resource. In addition, the first data and the second data may particularly be transmitted using the same time and channelization code (e.g. in 3G/HSPA).

According to an embodiment of the methods described herein, the first data does not include information on a modulation alphabet or a modulation scheme used for encoding the second data. In other words, a UE of interest detects received symbols for a co-scheduled UE on the basis of a modulation alphabet without knowing the modulation scheme that has actually been employed by the base station to encode data scheduled for the interfering UE or the modulation scheme used by the interfering UE for decoding received data symbols. For example, referring back to FIG. 3, the UE of interest does not receive information that the received data symbol 1 actually corresponds to a QPSK symbol 3. Rather, the receiver circuit or UE of interest detects the symbol on the basis of the QPSK, the 16-QAM and the 64-QAM modulation alphabets by searching the smallest distance $d_F$ as described above.

According to an embodiment of the methods described herein, the received signal includes first data transmitted from a first radio cell and second data transmitted from a second radio cell. For example, referring back to the detection of FIG. 3, the received data symbol 1 for the co-scheduled UE may be transmitted from a base station which is located in a radio cell which is not identical to the radio cell the receiver circuit or UE of interest is located at the same time. For example, the received data symbol 1 may be transmitted from a neighboring or directly adjacent radio cell.

According to an embodiment of the methods described herein, the first data may comprise at least one first spatial data stream and the second data may comprise at least one second spatial data stream. For example, one or more spatial data streams may be associated with the UE of interest while one or more spatial data streams may be associated with each of the interfering UEs, respectively. The spatial data streams are transmitted from a base station to the respective UE wherein a spatial data stream associated with an interfering UE may interfere with a data stream of the UE of interest.

According to an embodiment of the methods described herein, the received signal is received in a downlink direction. For example, the UE of interest and the co-scheduled UE may correspond to a mobile phone, respectively.

According to an embodiment of the methods described herein, a method may include a step of mitigating or attenuating an interference based on the second data at the first receiver circuit. For example, the actual attenuation of interference may take place due to a joint detection of the UE of interest and an interfering UE after the modulation of the interfering UE has been estimated.

Figure 4:
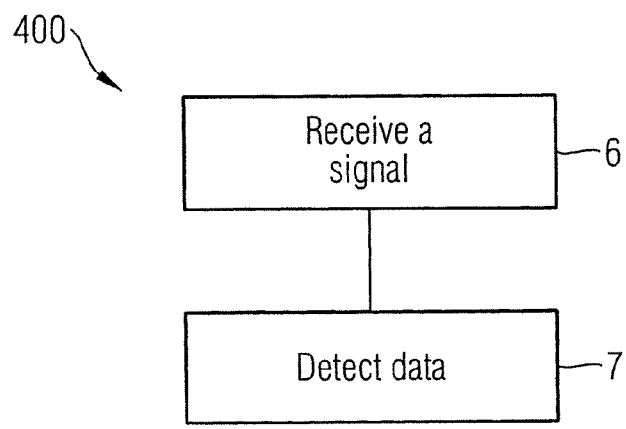
FIG. 4 schematically illustrates a method 400 as an exemplary embodiment.

FIG. 4 schematically illustrates a method 400 including method steps 6 and 7. In the method step 6, a signal is received at a first receiver circuit on the basis of a mobile communications standard supporting multiple predefined modulation alphabets. The received signal includes first data transmitted by a transmitter to the first receiver circuit and second data transmitted by the transmitter to a second receiver circuit. For example, the first and second receiver circuit may be included in a first and second UE, respectively, both UEs scheduled for a data transmission with MU-MIMO. In the method step 7, data is detected depending on the second data on the basis of a modulation alphabet which includes all modulation symbols of at least two of the multiple predefined modulation alphabets. For example, the modulation alphabet may include all modulation symbols of the QPSK and 16-QAM modulation schemes. It is noted that all comments made in connection with the method 200 may also hold true for the method 400.

Figure 5:
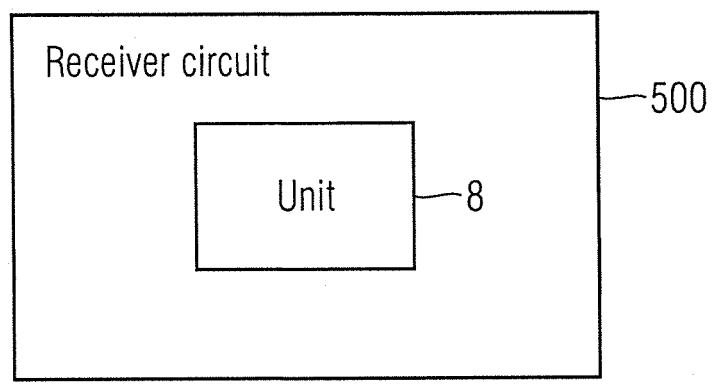
FIG. 5 schematically illustrates a receiver circuit 500 as an exemplary embodiment.

FIG. 5 schematically illustrates a receiver circuit 500 which may be configured to perform the method 200 in one embodiment, but is not so limited. The receiver circuit 500 is configured to receive a signal on the basis of a mobile communications standard supporting multiple predefined modulation alphabets (see FIG. 2, method step 4). The receiver circuit 500 includes a unit 8 configured to detect data of the received signal on the basis of a modulation alphabet which includes modulation symbols of at least two of the multiple predefined modulation alphabets (see FIG. 2, method step 5).

It is understood that the receiver circuit 500 may include further components which are not illustrated for the sake of simplicity. In particular, the receiver circuit 500 may include units configured to perform one or more of the features described in connection with the method 200. In addition, the receiver circuit 500 may include one or more input and output ports for receiving and outputting signals, down conversion units to down-convert analog signals lying in a radio frequency range into an intermediate frequency band or into the baseband, up conversion units for a conversion vice versa, Analog-to-Digital Converters (ADC), Digital-to-Analog Converters (DAC). The receiver circuit 500 may further include amplifiers, analog filters, digital filters, etc. The receiver circuit 500 may further include an equalizer to decode received data into metrics or LLR values and a decoder, e.g. a turbo decoder or a Viterbi decoder, to obtain an estimation of received data based on the metrics. Note that the receiver circuit 500 may also be configured to operate as a transmitter.

Figure 6:
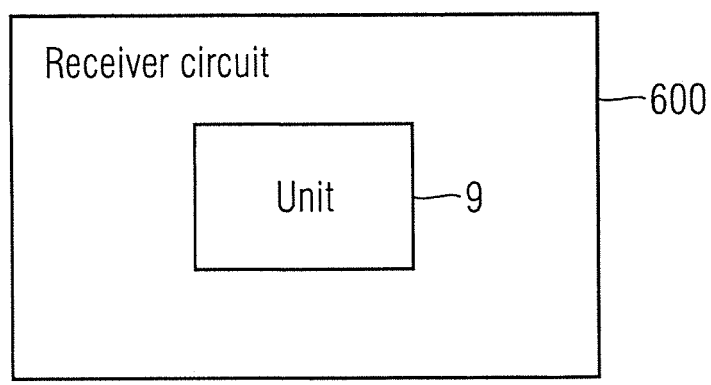
FIG. 6 schematically illustrates a receiver circuit 600 as an exemplary embodiment.

FIG. 6 schematically illustrates a receiver circuit 600 which may be configured to perform the method 400 in one embodiment, but is not so limited. The receiver circuit 600 is configured to receive a signal on the basis of a mobile communications standard supporting multiple predefined modulation alphabets wherein the received signal includes first data transmitted by a transmitter to the receiver circuit 600 and second data transmitted by the transmitter to a further receiver circuit (see FIG. 4, method step 6). The receiver circuit 600 includes a unit 9 configured to detect data depending on the second data on the basis of a modulation alphabet which includes all modulation symbols of at least two of the multiple predefined modulation alphabets (see FIG. 4, method step 7). Of course, the receiver circuit 600 may include further components which are not illustrated for the sake of simplicity. All comments made in connection with receiver circuit 500 may hold true for the receiver circuit 600.

Figure 7A:
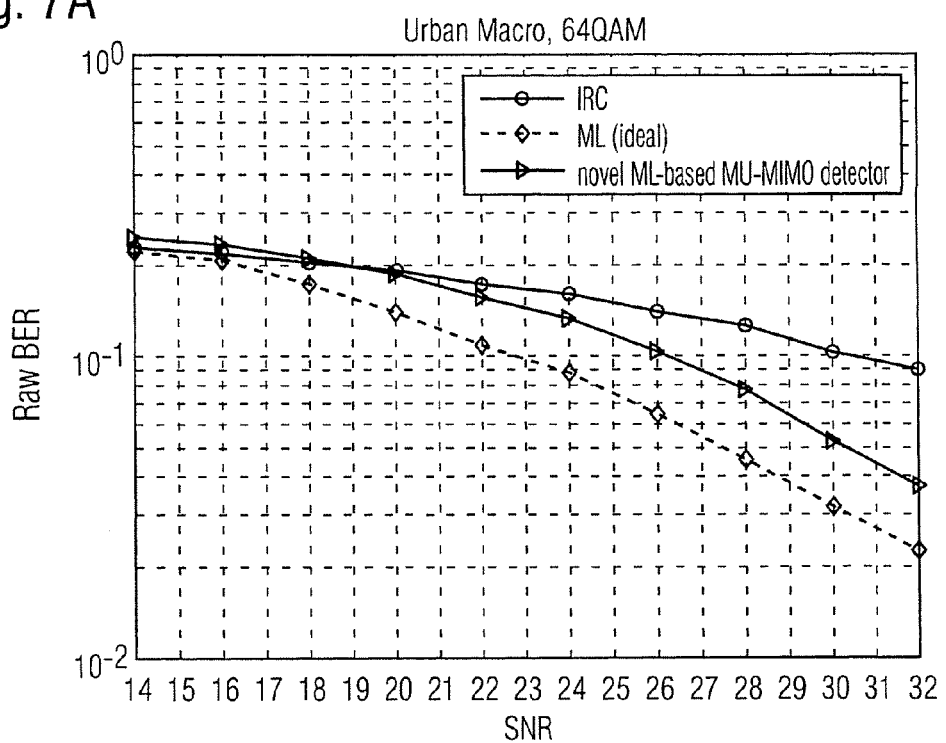
FIGS. 7A to 7D schematically illustrate performances of receiver circuits.
Figure 7B:
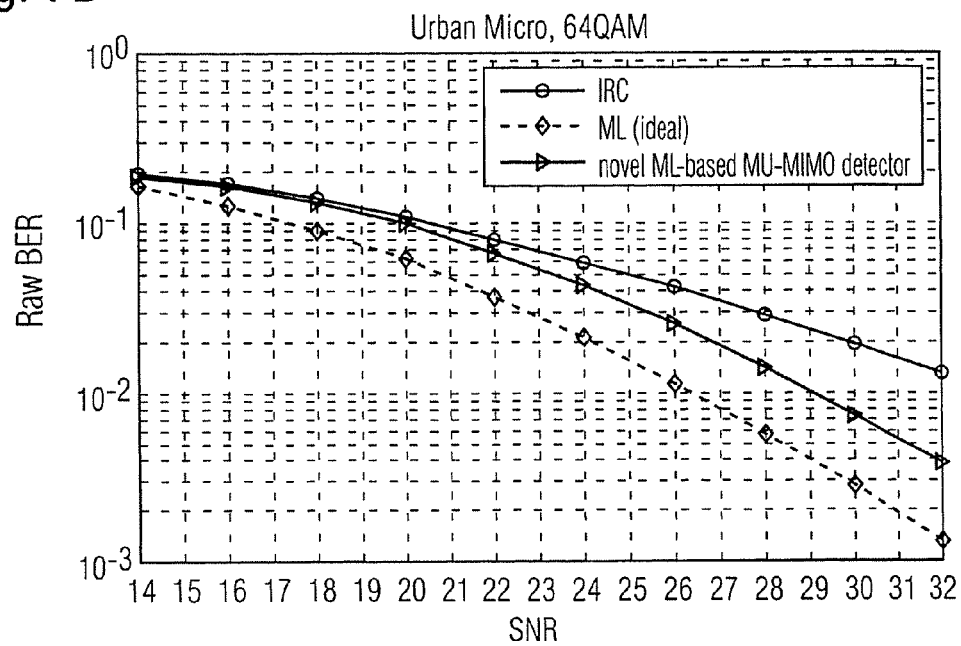
Figure 7C:
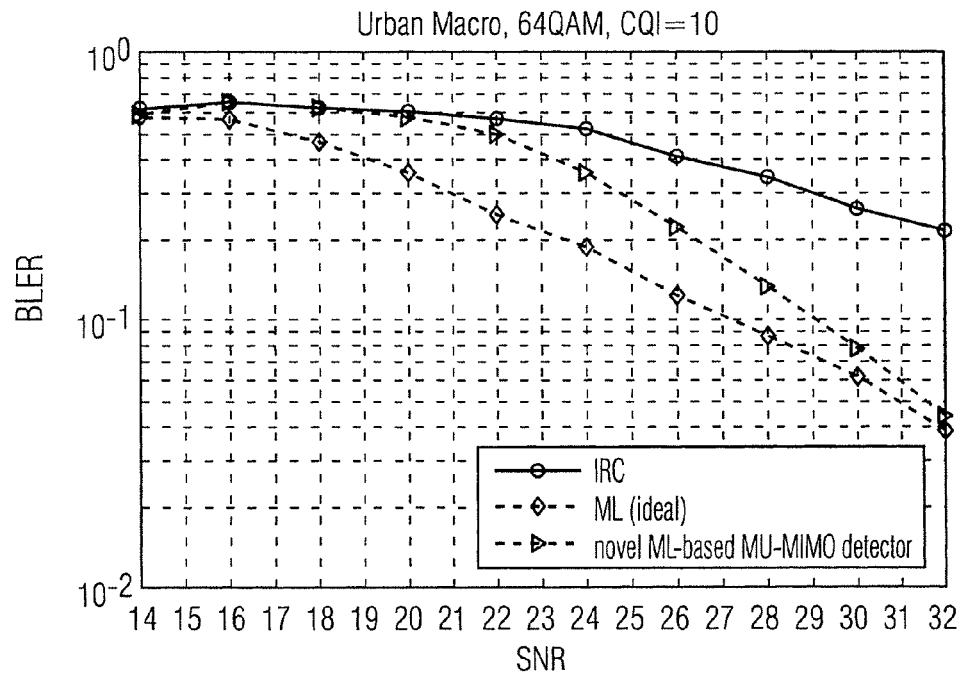
Figure 7D:
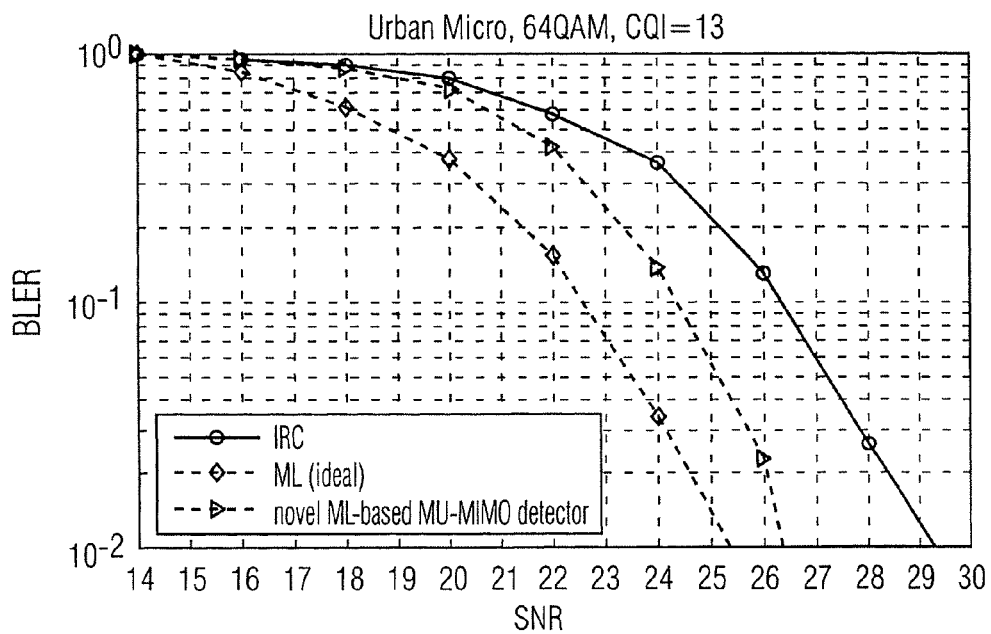

FIGS. 7A to 7D schematically illustrate performances of various receiver circuits including different types of detectors. In FIGS. 7A and 7B, an uncoded Bit Error Rate (Raw BER) is plotted against a Signal to Noise Ration (SNR) in dB while in FIGS. 7C and 7D a Block Error Rate (BLER) is plotted against an average SNR in dB. For each of FIGS. 7A to 7D an LTE radio communications system is considered wherein a line including small circles illustrates a performance of a receiver circuit including an Interference Rejection Combiner (see IRC) while a line including small diamonds illustrates a performance of a receiver circuit including an ideal ML detector, i.e. an ML detector to which the modulation scheme employed by the interfering co-scheduled UE is known. In addition, a line including small triangles illustrates a performance of a receiver circuit performing a method similar to one of the methods 200 and 400 wherein a modulation alphabet used for detecting data corresponds to $\{M_{QPSK}, M_{16\text{-}QAM}, M_{64\text{-}QAM}\}$. The illustrated scenarios are further specified by variables "Urban Micro" and "Urban Macro" which are e.g. known from various 3GPP specification. In FIGS. 7C and 7D, additional values of a Channel Quality Indicator (CQI) are provided.

Thus, FIG. 7A illustrates an uncoded BER performance with 64-QAM for the UE of interest in an Urban Macro Channel, FIG. 7B illustrates an uncoded BER performance with 64-QAM for the UE of interest in an Urban Micro Channel, FIG. 7C illustrates a BLER performance with 64-QAM (Code rate=0.5) for the UE of interest in an Urban Macro Channel, and FIG. 7D illustrates a BLER performance with 64-QAM (Code rate=0.75) for the UE of interest in an Urban Micro Channel.

From FIGS. 7A and 7B it becomes apparent that the detection according to one of the methods 200 and 400 outperforms the detection based on the IRC detector. Further, from FIG. 7A it can be seen that in high spatially correlated channels (see Urban Macro), the detection according to one of the methods 200 and 400 outperforms the detection based on the IRC detector by >5 dB and converges to the detection based on the ideal ML detector at high values for the SNR. From FIG. 7B it becomes apparent that in low spatially correlated channels (see Urban Micro), the detection according to one of the methods 200 and 400 shows a gain of up to 2 dB at a value $10^{-1}$ of the BLER compared to the detection based on the IRC detector. Generally, FIGS. 7A to 7D demonstrate that the detection according to one of the methods 200 and 400 converges to the detection based on the IRC at low SNR values since quantized symbols are similar to that of a soft symbol (i.e. an MMSE estimate). In addition, the detection according to one of the methods 200 and 400 converges to the detection based on the ideal ML detector for higher SNR values.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A method, comprising:
    receiving a signal on the basis of a mobile communications standard supporting multiple predefined modulation alphabets, wherein the received signal is received by a first receiver circuit and wherein the received signal comprises first data transmitted by a transmitter to the first receiver circuit and second data transmitted by a transmitter to a second receiver circuit, wherein the first data is modulated by a modulation alphabet which is known to the first receiver circuit and wherein the second data is modulated by a modulation alphabet which is unknown to the first receiver circuit; and
    jointly detecting the first data and the second data of the received signal by the first receiver circuit, wherein the first data is detected solely on the basis of the known modulation alphabet and the second data is detected on the basis of at least two of the predefined modulation alphabets.

2. The method of claim 1, wherein the modulation alphabet comprises all modulation symbols of at least two of the multiple predefined modulation alphabets.

3. The method of claim 1, wherein the modulation alphabet comprises all modulation symbols of all multiple predefined modulation alphabets.

4. The method of claim 1, wherein the modulation alphabet comprises at least two of a QPSK alphabet, a 16-QAM alphabet and a 64-QAM alphabet.

5. The method of claim 1, wherein each of the multiple predefined modulation alphabets is configured to encode all value combinations of at least two bits.

6. The method of claim 1, wherein detecting the second data comprises:
    performing a Maximum Likelihood algorithm or a Near Maximum Likelihood algorithm on the basis of the at least two of the predefined modulation alphabets.

7. The method of claim 1, further comprising:
    hard-coding information on the at least two of the predefined modulation alphabets in the first receiver circuit, wherein the information is retained when a power supply of the first receiver circuit is switched off.

8. The method of claim 1, wherein the received signal is received by a first receiver circuit and wherein the received signal comprises first data transmitted by a transmitter to the first receiver circuit and second data transmitted by a transmitter to a second receiver circuit.

9. The method of claim 8, wherein the detected data that comprises modulation symbols depends on the second data.

10. The method of claim 8, wherein the transmitter comprises a base station, the first receiver circuit comprises a first User Equipment and the second receiver circuit comprises a second User Equipment.

11. The method of claim 8, wherein the first data and the second data are transmitted simultaneously on a same time-frequency resource.

12. The method of claim 8, wherein the first data and the second data are transmitted simultaneously on a same time and channelization/spreading code.

13. The method of claim 8, wherein the first data does not comprise information on a modulation alphabet used for encoding the second data.

14. The method of claim 8, wherein the first data comprises a first spatial data stream and the second data comprises a second spatial data stream.

15. The method of claim 1, wherein the received signal comprises first data transmitted from a first radio cell and second data transmitted from a second radio cell.

16. The method of claim 1, wherein the received signal is received in a downlink direction.

17. The method of claim 1, wherein the received signal is received on the basis of a Multi-User Multiple-Input Multiple-Output technology.

18. A receiver circuit, comprising:
   a receiver circuit configured to receive a signal that comprises first data transmitted by a transmitter and second data transmitted by a transmitter, wherein the first data is modulated by a modulation alphabet known to the receiver circuit and
   wherein the second data is modulated by a modulation alphabet that is unknown to the receiver circuit; and
   a unit configured to jointly detect the first data and the second data of the received signal, wherein the first data is detected solely on the basis of the known modulation alphabet and the second data is detected on the basis of at least two predefined modulation alphabets.

19. The receiver circuit of claim 18, wherein the unit further comprises a unit configured to detect the second data by performing a Maximum Likelihood algorithm or a Near Maximum Likelihood algorithm on the received signal on the basis of the at least two of the predefined modulation alphabets.

20. The receiver circuit of claim 18, further comprising:
   a hard-coded information on the at least two of the predefined modulation alphabets in the first receiver circuit, wherein the information is retained when a power supply of the first receiver circuit is switched off.

* * * * *